United States Patent
Kumar et al.

(10) Patent No.: US 12,121,027 B2
(45) Date of Patent: Oct. 22, 2024

(54) HERBICIDAL COMBINATIONS

(71) Applicant: UPL LTD, Haldia (IN)

(72) Inventors: Ajit Kumar, Mumbai (IN); Jaidev Rajnikant Shroff, Dubai (AE); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 672 days.

(21) Appl. No.: 16/965,777

(22) PCT Filed: Jan. 25, 2019

(86) PCT No.: PCT/IB2019/050616
§ 371 (c)(1),
(2) Date: Jul. 29, 2020

(87) PCT Pub. No.: WO2019/150233
PCT Pub. Date: Aug. 8, 2019

(65) Prior Publication Data
US 2021/0030004 A1    Feb. 4, 2021

(30) Foreign Application Priority Data
Jan. 30, 2018 (IN) .............................. 201831003482

(51) Int. Cl.
*A01N 43/90* (2006.01)
*A01N 39/04* (2006.01)
*A01N 43/707* (2006.01)
*A01P 13/00* (2006.01)

(52) U.S. Cl.
CPC ............ *A01N 43/90* (2013.01); *A01N 39/04* (2013.01); *A01N 43/707* (2013.01); *A01P 13/00* (2021.08)

(58) Field of Classification Search
CPC ...... A01N 43/90; A01N 39/04; A01N 43/707; A01N 2300/00; A01N 43/64; A01N 43/84; A01N 47/20; A01N 39/02
See application file for complete search history.

(56) References Cited

U.S. PATENT DOCUMENTS

2012/0231952 A1* 9/2012 Simon .................. C07D 413/04
504/225

FOREIGN PATENT DOCUMENTS

| WO | 2011057935 A1 | 5/2011 |
| WO | 2011082958 A2 | 7/2011 |
| WO | 2012123408 A1 | 9/2012 |
| WO | 2013034513 A2 | 3/2013 |
| WO | 2015155236 A1 | 10/2015 |

OTHER PUBLICATIONS

Kirill V Sukhoverkov and Joshua S Mylne, "Systematic, small-scale screening with *Arabidopsis* reveals herbicides synergies that extend to lettuce", Pest Management Science, 2021, 77: 4930-4941. (Year: 2021).*
International Search Report and Written Opinion for International Application PCT/IB2019/050616; International Filing Date: Jan. 25, 2019; Date of Mailing: Mar. 20, 2019; 11 pages.
Kumar, S. et al.; "Bio-Efficacy of Pinoxaden 5 EC in Combination with Broadleaf Herbicides on Weed Species with Relation to Economics of Wheat (*Triticum aestivum* L.)"; Environment & Ecology, vol. 32, Issue No. 1; 2014; pp. 154-158.
Rana, S. S. et al.; "Evaluation of herbicide combinations for controlling complex weed flora in wheat"; Indian Journal of Weed Science, vol. 49, Issue No. 4; 2017; pp. 335-340.

* cited by examiner

*Primary Examiner* — Mina Haghighatian
*Assistant Examiner* — Nathan W Schlientz
(74) *Attorney, Agent, or Firm* — CANTOR COLBURN LLP

(57) ABSTRACT

Disclosed herein is a combination comprising Pinoxaden; at least one plant growth regulators selected from a group of antiauxins, auxins, cytokinins, defoliants, ethylene inhibitor, ethylene releaser, gametocides, gibberellins, growth inhibitors, morphactins, growth retardants, growth stimulators, unclassified plant growth regulators and/or at least another triazinone herbicide.

5 Claims, No Drawings

HERBICIDAL COMBINATIONS

CROSS REFERENCE TO RELATED APPLICATIONS

This application is a National Stage application of PCT/IB2019/050616, filed Jan. 25, 2019, which claims the benefit of Indian Patent Publication No. 201831003482, filed Jan. 30, 2018, both of which are incorporated by reference in their entirety herein.

TECHNICAL FIELD

The present invention relates to combinations of herbicides for controlling harmful undesirable plants. The present invention more specifically relates to a synergistic combination of herbicides.

BACKGROUND AND PRIOR ART

Weeds are undesirable plants that can severely damage yield in crops. Farmers usually control these plants at the pre-plant stage as well as after sowing. Modern herbicides are used to either control or suppress these undesirable plants so as to allow sown crops a greater share of nutrient.

Current practices include combining herbicides with varied modes of action, which allows for broader spectrum of control and resistance management. However, the combinations currently known are not sufficient to control the resistant and persistent weeds. Growers increasingly face complex weed situations that may not be controlled with just one herbicide.

ACCase inhibitors are primarily used for post-emergence grass control in broadleaf crops. These herbicides are absorbed through the foliage and translocated in the phloem to the growing point, where they inhibit meristematic activity. These herbicides inhibit the enzyme acetyl-CoA carboxylase (ACCase), which catalyzes the first step in fatty acid synthesis and is important for membrane synthesis. In general, broadleaf species are naturally resistant to FOPs, DIMs, and DENs herbicides because of a less sensitive ACCase enzyme. Natural tolerance of some grasses is due to a less sensitive ACCase enzyme or a higher rate of metabolic degradation. Combination of ACCase inhibitor with metribuzin are known from WO2012123408 A1 (Ratschinski et. al).

Photosynthetic Inhibitors control many broadleaf and some grass weeds. By interfering in the electron transport chain and indirectly membrane leakage and cell damage. These herbicides are excellent tools for controlling pre-emergent weeds. Metribuzin is a photosynthesis inhibitor herbicide that is used for both pre and post emergent control of broadleaf and annual grasses. Metribuzin is known to be combined with other herbicides such as the combinations known from WO2011082958 (Hubert et. al).

The combination of Pinoxaden with a plant growth regulator is not known in the art.

Combinations of herbicides are used to control a broader range of weeds. However, the combination of herbicides may not always result in the desired effect. Combination of herbicides may lead to an additive effect or an antagonistic effect. It may also result in phytotoxicity to the crops making it an undesirable combination. Agronomists must therefore, carefully select the herbicides that can be combined to offer a synergistic effect that would control weeds while having no phytotoxic effect on the crop and reduce the chances of development of herbicide resistant weeds.

There is therefore a need in the art for combinations that have advantageous properties such as a herbicidal combination that is synergistic, helps in resistance management, reduces dosage of herbicides used thus causing minimal damage to the environment, a herbicidal combination that has excellent residual effects.

Embodiments of the present invention may therefore ameliorate one or more of the above-mentioned problems:

SUMMARY OF THE INVENTION

Therefore, in one aspect, the present invention may provide a synergistic combination comprising:
a) pinoxaden; and
b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators.

Another aspect of the present invention may provide a method of controlling weeds at a locus, said method comprising applying to the locus a combination comprising:
(a) pinoxaden; and
(b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators.

Another aspect of the present invention may provide a synergistic composition comprising:
a) pinoxaden; and
b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators.

Yet another aspect of the present invention may provide a method of increasing yield in a crop by application of a synergistic combination comprising:
(a) pinoxaden; and
(b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators.

Another aspect of the present invention may provide a method of improving the plant health, said method comprising application at the locus of the plant a combination comprising:
(a) pinoxaden; and
(b) at least one plant growth regulators selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators.

In another aspect, the present invention may provide a synergistic combination comprising:
a) pinoxaden;
b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators; and
c) at least one triazinone herbicide.

Another aspect of the present invention may provide a method of controlling weeds at a locus, said method comprising applying to the locus a combination comprising:
a) pinoxaden;
b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, unclassified plant growth regulators; and
c) at least one triazinone herbicide.

Another aspect of the present invention may provide a synergistic composition comprising:
(a) pinoxaden;
(b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, unclassified plant growth regulators; and
(c) at least one triazinone herbicide.

Yet another aspect of the present invention may provide a method of increasing yield in a crop by application of a synergistic combination comprising:
(a) pinoxaden;
(b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, unclassified plant growth regulators; and
(c) at least one triazinone herbicide.

Another aspect of the present invention may provide a method of improving the plant health, said method comprising application at the locus of the plant a combination comprising:
(a) pinoxaden;
(b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators; and
(c) at least one triazinone herbicide.

DETAILED DESCRIPTION OF THE INVENTION

The term herbicide, as used herein, shall mean an active ingredient that kills, controls or otherwise adversely modifies the growth of plants. As used herein, a herbicidally effective or vegetation controlling amount is an amount of active ingredient that causes a "herbicidal effect," i.e., an adversely modifying effect and includes deviations from natural development, killing, regulation, desiccation, retardation. The terms "plants" and "vegetation" include, but are not limited to, germinant seeds, emerging seedlings, plants emerging from vegetative propagules, and established vegetation. The term "locus" as used herein shall denote the vicinity of a desired crop in which weed control, typically selective weed control, of dicotyledonous weeds is desired. The locus includes the vicinity of desired crop plants wherein the weed infestation has either emerged or is yet to emerge. The term crop shall include a multitude of desired crop plants or an individual crop plant growing at a locus.

Protection of planted crops from undesirable plants which inhibit crop growth is a perpetual struggle for all farmers. Herbicides have been used to control growth of such plants, there are many herbicides and combination known in the art. There, however, still remains a need for improved herbicidal combinations that can effectively control weeds, thereby, improving yield and plant health, with reduced phytotoxicity.

Pinoxaden is a ACCase inhibitor herbicide, its chemical name is N 8-(2,6-diethyl-p-tolyl)-1,2,4,5-tetrahydro-7-oxo-7H-pyrazolo[1,2-d][1,4,5]oxadiazepin-9-yl 2,2-dimethyl-propionate and has the structure:

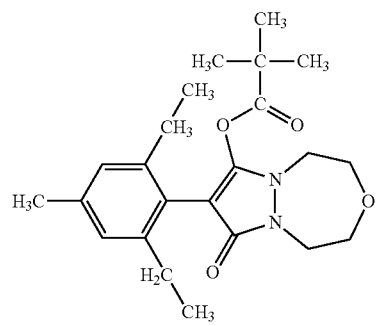 [SMILES: CCc1cc(C)cc(CC)c1-c1c(OC(=O)C(C)(C)C)n2n(c1=O)CCOCC2]

One example of a second herbicide according to the present invention is CIPC i.e. chlorpropham. Chlorpropham is a Mitosis inhibitor herbicide and a plant growth regulator. Its chemical name is isopropyl 3-chlorocarbanilate, and has the structure:

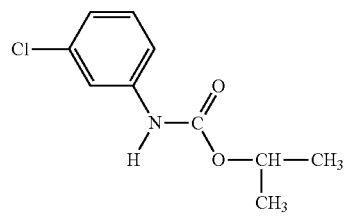

One example of a triazinone herbicide is Metamitron. Metamitron is a photosynthetic inhibitor herbicide, its chemical name is N-(1-ethylpropyl)-2,6-dinitro-3,4-xylidine and has the chemical structure:

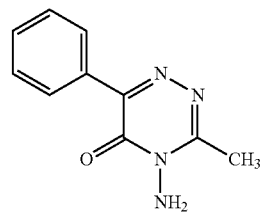

Surprisingly, it has been found by the present inventors that the combination of herbicides belonging to classes of Accase inhibitors, mitosis inhibitors and photosystem II inhibitors results in a synergistic control of undesirable plants at the locus of the plant.

Thus an embodiment of the present invention may provide a synergistic combination comprising:
(a) Pinoxaden; and
(b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, unclassified plant growth regulators.

In another aspect, the present invention provides a method of controlling weeds at a locus by applying the combination of the present invention to the locus. Thus, in this aspect, the present invention may provide a method of controlling weeds at a locus, said method comprising applying to the locus a combination comprising:
a) Pinoxaden; and
b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, unclassified plant growth regulators.

In another aspect, the present invention provides a composition comprising the combinations of the present invention. Therefore, in this aspect, the present invention may provide a synergistic composition comprising:
(a) Pinoxaden; and
(b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators.

In another aspect, the present invention provides a method for increasing yield in a crop by using the combinations of the present invention. Therefore, in this aspect, the present invention may provide a method of increasing yield in a crop by application of a synergistic combination comprising:
(a) Pinoxaden; and
(b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators.

In another aspect, the present invention may provide a method of improving the plant health using the combinations of the present invention. Therefore, in this aspect, the present invention may provide a method of improving the plant health, said method comprising application at the locus of the plant a combination comprising:
(a) Pinoxaden; and
(b) at least one plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, unclassified plant growth regulators.

Each of the aspect described above may have one or more embodiments.

In each of these embodiments, apart from pinoxaden, the embodiments may include a first and a second herbicide. As used herein, the term first herbicides includes a plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators. The term second herbicide includes at least one triazinone herbicide.

Each of the embodiments described hereinafter may apply to one or all of the aspects described hereinabove. These embodiments are intended to be read as being preferred features of one or all of the aspects described hereinabove. Each of the embodiments described hereinafter applies to each of the aspects described hereinabove individually.

In an embodiment, the first herbicide is a plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators.

In an embodiment, the antiauxin herbicide is selected from clofibric acid and 2,3,5-triiodobenzoic acid.

In an embodiment, the auxin herbicide is selected from 4-CPA; 2,4-D; 2,4-DB; 2,4-DEP; dichlorprop; fenoprop; IAA; IBA; naphthaleneacetamide; α-naphthaleneacetic acids; 1-naphthol; naphthoxyacetic acids; potassium naphthenate; sodium naphthenate and 2,4,5-T.

In an embodiment, the cytokinin herbicide is selected from 2iP, benzyladenine, 4-hydroxyphenethyl alcohol, kinetin and zeatin.

In an embodiment, the defoliant herbicide is selected from calcium cyanamide, dimethipin, endothal, ethephon, merphos, metoxuron pentachlorophenol, thidiazuron, and tribufos.

In an embodiment, the ethylene inhibitor herbicide is selected from aviglycine and 1-methylcyclopropene.

In an embodiment, the ethylene releasers is selected from ACC, etacelasil, ethephon, glyoxime.

In an embodiment, the triazolopyrimidine herbicide is selected from cloransulam, diclosulam, florasulam, flumetsulam, metosulam, penoxsulam and pyroxsulam.

In an embodiment, the frost protectant herbicide is heptamaloxyloglucan.

In an embodiment, the gametocide herbicide is fenridazon and maleic hydrazide.

In an embodiment, the gibberellin herbicide is gibberellins and gibberellic acid.

In an embodiment, the growth inhibitor herbicide is abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat, piproctanyl prohydrojasmon, propham, tiaojiean and 2,3,5-triiodobenzoic acid.

In an embodiment, the morphactin herbicide is chlorfluren, chlorflurenol, dichlorflurenol and flurenol.

In an embodiment, the growth retardant herbicide is chlormequat, daminozide, flurprimidol, mefluidide, paclobutrazol and tetcyclacis uniconazole.

In an embodiment, the growth stimulator herbicide is brassinolide, brassinolide-ethyl, DCPTA, forchlorfenuron, hymexazol, psoralen, pyripropanol and triacontanol.

In an embodiment, the unclassified plant growth regulator herbicide is bachmedesh, benzofluor, buminafos, carvone, choline chloride, ciobutide, clofencet, cloxyfonac, cyanamide, cyclanilide, cycloheximide, cyprosulfamide, epocholeone, ethychlozate, ethylene, fuphenthiourea, furalane, heptopargil, holosulf, inabenfide, karetazan, lead arsenate, methasulfocarb, prohexadione, pydanon, sintofen, triapenthenol and trinexapac.

In a preferred embodiment, the combinations and methods of the present invention comprise Pinoxaden and at least one plant growth regulator.

The plant growth regulator is selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators.

In an embodiment the present invention provides a combination and method comprising pinoxaden and at least one herbicide selected from 2,4-D, 1-methylcyclopropene and chlorpropham.

In an embodiment the present invention provides a combination and method comprising pinoxaden and chlorpropham.

In a preferred embodiment, the combinations and methods of the present invention comprise Pinoxaden, a first herbicide and a second herbicide.

In a preferred embodiment, the first herbicide is a plant growth regulator selected from the group consisting of antiauxins, auxins, cytokinins, defoliants, ethylene inhibitor, ethylene releaser, gametocides, gibberellins, growth inhibitors, morphactins, growth retardants, growth stimulators, and unclassified plant growth regulators.

In an embodiment, the second herbicide is a triazinone herbicide.

In an embodiment, the triazinone herbicides herbicide may be selected from ametridione, amibuzin, ethiozin, hexazinone, isomethiozin, metamitron, metribuzin and trifludimoxazin.

In an embodiment, the present invention provides a combination and method comprising:
(i) pinoxaden;
(ii) at least one herbicide selected from 2,4-D, 1-methylcyclopropene and chlorpropham; and
(iii) at least one triazinone herbicide selected from ametridione, amibuzin, ethiozin, hexazinone, isomethiozin, metamitron, metribuzin and trifludimoxazin.

In an embodiment, the triazinone herbicide may be selected from metamitron and metribuzin.

Thus, in an embodiment, the present invention provides a combination and method comprising:
(i) pinoxaden;
(ii) at least one herbicide selected from 2,4-D, 1-methylcyclopropene and chlorpropham; and
(iii) metamitron or metribuzin.

In an embodiment, the present invention provides preferred combinations, compositions and methods thereof. The methods of the invention include a method of controlling weeds at a locus by applying to the locus the combination or the composition, a method of increasing yield in a crop by application of the combination or composition, or a method of improving the plant health by application at the locus of the plant the combination or the composition. The embodiments described herein describe the preferred embodiments of all these possible combinations, compositions and methods of the invention.

Therefore, an embodiment of the present invention provides a combination and method comprising pinoxaden; chlorpropham; and Metamitron.

An embodiment of the present invention provides a combination and method comprising pinoxaden, chlorpropham, and Metribuzin.

An embodiment of the present invention provides a combination and method comprising pinoxaden, chlorpropham, and ametridione.

An embodiment of the present invention provides a combination and method comprising Pinoxaden, chlorpropham and amibuzin.

An embodiment of the present invention provides a combination and method comprising Pinoxaden, chlorpropham, and ethiozin.

An embodiment of the present invention provides a combination and method comprising Pinoxaden, chlorpropham and hexazinone.

An embodiment of the present invention provides a combination and method comprising Pinoxaden, chlorpropham and isomethiozin.

An embodiment of the present invention provides a combination and method comprising Pinoxaden, chlorpropham and trifludimoxazin.

Therefore, an embodiment of the present invention provides a combination and method comprising pinoxaden; 2,4-D and Metamitron.

An embodiment of the present invention provides a combination and method comprising pinoxaden, 2,4-D and Metribuzin.

An embodiment of the present invention provides a combination and method comprising pinoxaden, 2,4-D and ametridione.

An embodiment of the present invention provides a combination and method comprising Pinoxaden, 2,4-D and amibuzin.

An embodiment of the present invention provides a combination and method comprising Pinoxaden, 2,4-D and ethiozin.

An embodiment of the present invention provides a combination and method comprising Pinoxaden, 2,4-D and hexazinone.

An embodiment of the present invention provides a combination and method comprising Pinoxaden, 2,4-D and isomethiozin.

An embodiment of the present invention provides a combination and method comprising Pinoxaden, 2,4-D and trifludimoxazin.

These combinations may be applied to the locus of the weeds in an herbicidally effective amount.

In an embodiment, the combination of the present invention may be combined with at least one other active such as those selected from but not limited to an additional herbicide, insecticide, fungicide, biological agent, plant growth activator, fertilizers or combinations thereof.

Thus, in an embodiment, the combination of the present invention may be combined with a herbicide, exemplary herbicides that may be combined with the combination of the present invention may be selected from but not limited to herbicides belonging to classes such as ACCase inhibitors, ALS inhibitors, EPSP synthase inhibitors, synthetic auxins, auxin transport inhibitors, glutamate synthase inhibitors, HPPD inhibitors, lipid synthesis inhibitors, long chain fatty acid inhibitors, as well as herbicides with unknown modes of action.

In an embodiment, the total amount of Pinoxaden in the composition may typically be in the range of 0.1 to 99% by weight, preferably 0.2 to 90% by weight. The total amount of chlorpropham in the composition may be in the range of 0.1 to 99% by weight. The total amount of Metamitron in the composition may be in the range of 0.1 to 99% by weight.

In an embodiment, the constituent herbicides of the combination of the present invention may be admixed in ratio of (1-80):(1-80):(1-80) of Pinoxaden, chlorpropham and metamitron respectively.

In an embodiment, the constituent herbicides of the combination of the present invention may be admixed in ratio of (1-80):(1-80):(1-80) of Pinoxaden, 2,4-D and metamitron respectively.

In an embodiment, the constituent herbicides of the combination of the present invention may be admixed in ratio of (1-80):(1-80):(1-80) of Pinoxaden, chlorpropham and metribuzin respectively.

In an embodiment, the constituent herbicides of the combination of the present invention may be admixed in ratio of (1-80):(1-80):(1-80) of Pinoxaden, 2,4-D and metribuzin respectively.

The herbicidal combination of the present invention may be used to target weeds among the crops such corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica*, colocasia, etc., flowers, foliage plants, turf grasses, fruits: pome fruits such apple, pear, quince, etc, stone fleshy fruits such as peach, plum, nectarine, *Prunus mume*, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, *Eucalyptus, Ginkgo biloba*, lilac, maple, *Quercus*, poplar, Judas tree, *Liquidambar formosana*, plane tree, zelkova, Japanese arborvitae, fir wood, hemlock, juniper, *Pinus, Picea*, and *Taxus* cuspidate, etc.

In an aspect, the present invention may provide synergistic compositions of Pinoxaden, chlorpropham and Metamitron.

In an aspect, the present invention may provide synergistic compositions of Pinoxaden, 2,4-D and metribuzin.

In an embodiment, the composition of the present invention may contain agriculturally acceptable adjuvants, carriers, diluents, emulsifiers, fillers, anti-foaming agents, thickening agents, anti-freezing agents, freezing agents etc. The compositions may be either solid or liquids. They can be solids, such as, for example, dusts, granules, water-dispersible granules, microcapsules or wettable powders, or liquids, such as, for example, emulsifiable concentrates, solutions, emulsions or suspensions, ZC formulations. They can also be provided as a pre-mix or tank mixed.

Suitable agricultural adjuvants and carriers may include, but are not limited to, crop oil concentrates; methylated seed oils, emulsified methylated seed oil, nonylphenol ethoxylate; benzylcocoalkyldimethyl quaternary ammonium salt; blend of petroleum hydrocarbon, alkyl esters, organic acid, and anionic surfactant; C9-C11 alkylpolyglycoside; phosphated alcohol ethoxylate; natural primary alcohol (C12-C16) ethoxylate; di-sec-butylphenol EO-PO block copolymer; polysiloxane-methyl cap; nonylphenol ethoxylate, urea ammonium nitrate; tridecyl alcohol (synthetic) ethoxylate (8EO); tallow amine ethoxylate; PEG (400) dioleate-99, alkyl sulfates, such as diethanolammonium lauryl sulfate; alkylarylsulfonate salts, such as calcium dodecylbenzenesulfonate; alkylphenol-alkylene oxide addition products, such as nonylphenol-Cm ethoxylate; alcohol-alkylene oxide addition products, such as tridecyl alcohol-Cm ethoxylate; soaps, such as sodium stearate; alkyl-naphthalene-sulfonate salts, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, and in certain embodiments, methyl esters.

Suitable liquid carriers that may be employed in a composition of the present invention may include water or organic solvents. The organic solvents include, but are not limited to, petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like. Organic solvents include, but are not limited to toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide.

Solid carriers that may be employed in the compositions of the present invention may include but are not limited to attapulgite, pyrophyllite clay, silica, kaolin clay, kieselguhr, chalk, diatomaceous earth, lime, calcium carbonate, bentonite clay, Fuller's earth, talc, cottonseed hulls, wheat flour, soybean flour, pumice, wood flour, walnut shell flour, lignin, cellulose etc.

In an aspect, the present invention may provide methods of controlling weeds at a locus, said method comprising application of a synergistic combination of Pinoxaden and chlorpropham.

In another aspect, the present invention may provide methods of controlling weeds at a locus, said method comprising application of a synergistic combination of Pinoxaden; chlorpropham and metamitron.

Thus, embodiments of the present invention may provide a method of controlling weeds at a locus, said method comprising application of synergistic combinations of pinoxaden, chlorpropham, metamitron and optionally a fourth active.

In an embodiment, the fourth active, may be selected from herbicide, insecticide, fungicide, biological agent, plant growth activator, fertilizers or combinations thereof.

The target weeds may be selected from *Alopecurus myosuroides* Huds. (blackgrass, ALOMY), *Phalaris minor; Amaranthus palmeri* S. Wats. (Palmer amaranth, AMAPA), *Avena fatua* L. (wild oat, AVEFA), *Brachiaria decumbens* Stapf. or *Urochloa decumbens* (Stapf) R. D. Webster (Surinam grass, BRADC), *Brachiaria brizantha* (Hochst. ex A. Rich.) Stapf. or *Urochloa brizantha* (Hochst. ex A. Rich.) R. D. (beard grass, BRABR), *Brachiaria platyphylla* (Groseb.) Nash or *Urochloa platyphylla* (Nash) R. D. Webster (broadleaf signalgrass, BRAPP), *Brachiaria plantaginea* (Link) Hitchc. or *Urochloa plantaginea* (Link) R. D. Webster (alexandergrass, BRAPL), *Cenchrus echinatus* L. (southern sandbur, CENEC), *Digitaria horizontalis* Willd. (Jamaican crabgrass, DIGHO), *Digitaria insularis* (L.) Mez ex Ekman (sourgrass, TRCIN), *Digitaria sanguinalis* (L.) Scop. (large crabgrass, DIGSA), *Echinochloa crus-galli* (L.) P. Beauv. (barnyardgrass, ECHCG), *Echinochloa colonum* (L.) Link (junglerice, ECHCO), *Eleusine indica* (L.) Gaertn. (goosegrass, ELEIN), *Lolium multiflorum* Lam. (Italian ryegrass, LOLMU), *Panicum dichotomiflorum* Michx. (fall *panicum*, PANDI), *Panicum miliaceum* L. (wild-proso millet, PANMI), *Sesbania exaltata* (Raf.) Cory/Rydb. Ex Hill (hemp *sesbania*, SEBEX), *Setaria faberi* Herrm. (giant foxtail, SETFA), *Setaria viridis* (L.) Beauv. (green foxtail, SETVI), *Sorghum halepense* (L.) Pers. (Johnsongrass, SORHA), *Sorghum bicolor* (L.) Moench ssp. *Arundinaceum* (shattercane, SORVU), *Cyperus esculentus* L. (yellow nutsedge, CYPES), *Cyperus rotundus* L. (purple nutsedge, CYPRO), *Abutilon theophrasti* Medik. (velvetleaf, ABUTH), *Amaranthus* species (pigweeds and amaranths, AMASS), *Ambrosia artemisiifolia* L. (common ragweed, AMBEL), *Ambrosia psilostachya* DC. (western ragweed, AMBPS), *Ambrosia trifida* L. (giant ragweed, AMBTR), *Anoda cristata* (L.) Schlecht. (spurred *anoda*, ANVCR), *Asclepias syriaca* L. (common milkweed, ASCSY), *Bidens pilosa* L. (hairy beggarticks, BIDPI), *Borreria* species (BOISS), *Borreria alata* (Aubl.) DC. or *Spermacoce alata* Aubl. or *Spermacoce latifolia* (broadleaf buttonweed, BOILF), *Chenopodium album* L. (common lambsquarters, CHEAL), *Cirsium arvense* (L.) Scop. (Canada thistle, CIRAR), *Commelina benghalensis* L. (tropical spiderwort, COMBE), *Datura stramonium* L. (jimsonweed, DATST), *Daucus carota* L. (wild carrot, DAUCA), *Euphorbia heterophylla* L. (wild poinsettia, EPHHL), *Euphorbia hirta* L. or *Chamaesyce hirta* (L.) Millsp (garden spurge, EPHHI), *Euphorbia dentata* Michx. (toothed spurge, EPHDE), *Erigeron bonariensis* L. or *Conyza bonariensis* (L.) Cronq. (hairy fleabane, ERIBO), *Erigeron canadensis* L. or *Conyza canadensis* (L.) Cronq. (horseweed, ERICA), *Conyza sumatrensis* (Retz.) E. H. Walker (tall fleabane, ERIFL), *Helianthus annuus* L. (common sunflower, HELAN), *Jacquemontia tamnifolia* (L.) Griseb. (smallflower morningglory, IAQTA), *Ipomoea hederacea* (L.) Jacq. (ivyleaf morningglory, IPOHE), *Ipomoea lacunosa* L. (white morningglory, IPOLA), *Lactuca serriola* L./Torn. (prickly lettuce, LACSE), *Portulaca oleracea* L. (common purslane, POROL), *Richardia* species (pusley, RCHSS), *Salsola tragus* L. (Russian thistle, SASKR), *Sida* species (*sida*, SIDSS), *Sida spinosa* L. (prickly *sida*, SIDSP), *Sinapis arvensis* L. (wild mustard, SINAR), *Solanum ptychanthum* Dunal (eastern black nightshade, SOLPT), *Tridax procumbens* L. (coat buttons, TRQPR), or *Xanthium strumarium* L. (common cocklebur, XANST).

In an embodiment, the combinations of the present invention may be applied to the locus either simultaneously or sequentially, such that Pinoxaden, first herbicide and second herbicide may be applied in a tank mix or as a pre-mixed composition.

In an embodiment, the present invention may be applied either pre or post emergent. The advantage of the combination is surprisingly good residual effects, when applied in pre-emergent as well as quick knockdown when applied post emergent leading to quick control of weeds.

The method of control of the present invention may be carried out by spraying the suggested tank mixes, or the individual herbicides may be formulated as a kit-of-parts containing various components that may be mixed as instructed prior to spraying.

In an embodiment the components of the present invention may be packaged such that pinoxaden, the first herbicide and the second herbicide may be packaged separately and then tank mixed before the spraying.

In another embodiment the components of the present invention may be packaged such that pinoxaden, the first herbicide and the second herbicide may be packaged separately, whereas other additives are packaged separately, such that the two may be tank mixed at the time of spraying.

In another embodiment the components of the present invention may be packaged as composition such that pinoxaden, the first herbicide and the second herbicide are formulated into one composition and other additives are packaged separately, such that the two may be tank mixed at the time of spraying.

Surprisingly, it has been found by the present inventors, that Pinoxaden, the first herbicide and the second herbicide of the present invention, when applied individually, was ineffective in the control of weeds, but demonstrated excellent synergistic control on target weeds when applied together. The combination controlled the weed both pre and post emergently. The combination of pinoxaden, the first herbicide and the second herbicide of the present invention synergistically controlled broadleaf as well as grasses a particular locus. The current invention therefore provides advantageous methods of controlling weeds both pre and post emergently. The present method also provides a broader spectrum of controlling weeds that helps in resistance management, thus preventing the weed from becoming resistant to either of the herbicides whist providing a broader spectrum of control at lower use rates.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Examples

Trials were carried out for evaluating the herbicidal mixtures of the invention on different weeds. The percentage control was calculated from the observed percent weed coverage data after 15 DAA and 30 DAA. The results are tabulated as hereunder:

TABLE 1

| Treatment | Dosage | Chenopodium album | | Phalaris minor | |
|---|---|---|---|---|---|
| | | Expected | Actual | Expected | Actual |
| | | 15DAA | | | |
| Untreated check | — | | 0.00 | | 0.00 |
| Pinoxaden | 46 g/ha | | 68 | | 53.4 |

TABLE 1-continued

| Treatment | Dosage | Chenopodium album Expected | Chenopodium album Actual | Phalaris minor Expected | Phalaris minor Actual |
|---|---|---|---|---|---|
| Metribuzin | 280 g/ha | | 78 | | 67.4 |
| 2,4-D | 500 g/ha | | 90.3 | | 29 |
| Pinoxaden + Metribuzin + 2,4-D | 64 g/ha + 725 g/ha + 280 g/ha | 73.25 | 94 | 87.68 | 91.3 |
| Observed efficacy − Expected efficacy | | | 20.75 | | 3.62 |

TABLE 2

| Treatment | Dosage | Chenopodium album Expected | Chenopodium album Actual | Phalaris minor Expected | Phalaris minor Actual |
|---|---|---|---|---|---|
| | | | 30DAA | | |
| Untreated check | — | | 0.00 | | 0.00 |
| Pinoxaden | 46 g/ha | | 85.3 | | 73.6 |
| Metribuzin | 280 g/ha | | 88 | | 73.8 |
| 2,4-D | 500 g/ha | | 86 | | 30.2 |
| Pinoxaden + Metribuzin + 2,4-D | 64 + 725 + 280 | 78.64 | 97 | 84.42 | 97.7 |
| Observed efficacy − Expected efficacy | | | 18.36 | | 13.28 |

CONCLUSION

It was thus found that the combination of Pinoxaden, Metribuzin and 2,4-D was efficacious over individual active ingredient.

The invention claimed is:

1. A combination consisting of:
pinoxaden, 2,4-D and metribuzin.

2. A method of controlling weeds at a locus, said method comprising applying to the locus the combination in accordance with claim 1.

3. A method of improving the plant health comprising applying to the plant the combination in accordance with claim 1.

4. A method for increasing yield in a crop comprising applying to the crop the combination in accordance with claim 1.

5. A composition comprising a combination of herbicides and agriculturally acceptable adjuvants, carriers, diluents, emulsifiers, fillers, anti-foaming agents, thickening agents, anti-freezing agents, and/or freezing agents, wherein the combination of herbicides consists of pinoxaden, 2,4-D and metribuzin.

* * * * *